June 1, 1965   A. G. CLEM   3,186,896
MOISTURE IMPERVIOUS PANEL
Filed May 9, 1962
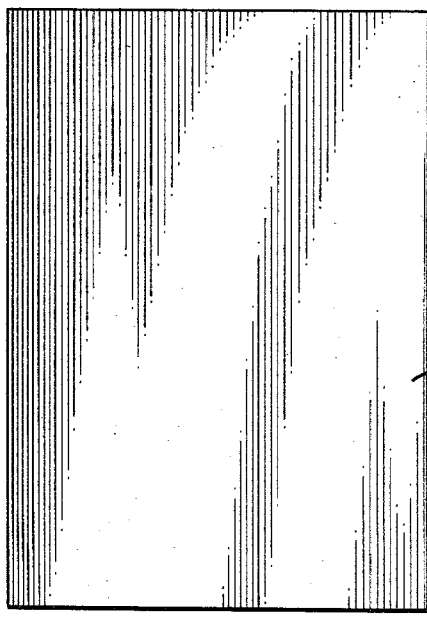
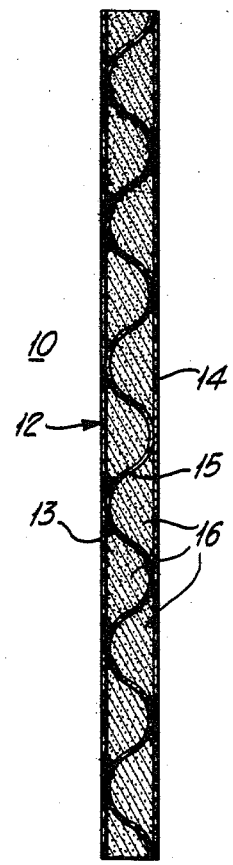
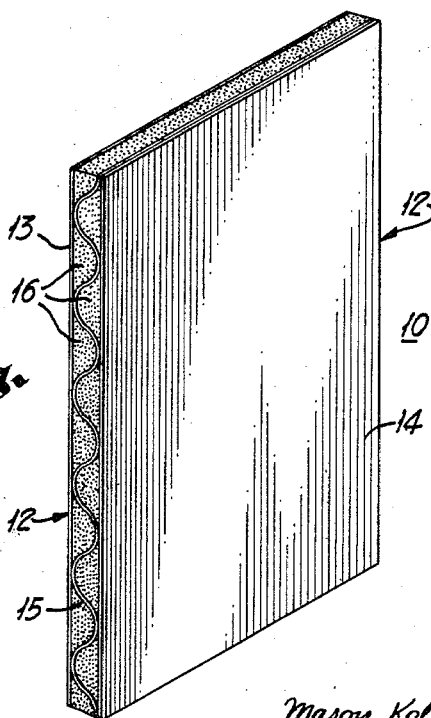
INVENTOR.
Arthur G. Clem
BY
Mason, Kolekmainen, Rathburn and Wyss.
Attorneys.

3,186,896
MOISTURE IMPERVIOUS PANEL
Arthur G. Clem, Des Plaines, Ill., assignor to American Colloid Company, Skokie, Ill., a corporation of Delaware
Filed May 9, 1962, Ser. No. 193,543
1 Claim. (Cl. 161—133)

This invention relates to an improved moisture impervious panel and more particularly, to a preformed moisture impervious panel which may be sawed or otherwise cut into a desired shape.

It is already known to provide seepage resistant structures by employing a mass of swellable bentonite across the path of possible seepage or flow and confining the mass to the area of possible seepage. One such method and means for impeding the seepage or flow of water is disclosed in United States Patent No. 2,277,286, granted March 24, 1942, to Paul Bechtner, and assigned to the same assignee as the present invention. As therein more fully described, commercial bentonite was used to block leakage or flow of water seepage and structures of various types were safeguarded against leakage by blocking the path of flow of the water with bentonitic or highly colloidal clay which possesses the capacity to swell and gelatinize upon contact with water. One of the clays found best suited for this purpose was the true bentonite obtained in regions of Wyoming and South Dakota, although other highly colloidal, or bentonitic clays which possess the property of swelling and gelatinizing in water to a substantial degree are also useful. The degree of their effectiveness, of course, depends upon the closeness with which their swelling properly corresponds to that of true bentonite.

Some physical characteristics which distinguish bentonite from other clays are its permeable texture and its extremely small grain size. The grain particles, when wetted, adsorb films of water that are thicker than the films which form on other claylike materials, and after the bentonite has been wetted the water cannot be expelled, even at high pressures. The strong adsorptive power of commercial bentonite which will adsorb almost five times its weight of water is partially attributable to the preponderance of extremely small grains or particles, providing tremendous surface area for the exertion of adsorptive powers and the film retaining capacity of these particles. Commercial bentonite swells when contacted with water as much as ten to twenty times its dry volume. One factor which causes this swelling is the separation of the small particles by the water films adsorbed thereon. Another is the distinctive nature of the particles themselves, which are composed of minute platelike structures that possess the peculiar property of allowing water molecules to penetrate their crystal lattice. The crystal structure itself is thus expanded. A third factor is the mutual repulsion of the particles due to like negative polarity. In its swollen condition, bentonite has several advantageous properties; it will carry materials in suspension; it exerts a cohesive effect; when left quiescent it forms a permanent gel, the viscosity of which increases upon aging. An important aspect of the swelling of bentonite is that it will swell only to the extent necessary to fill available space without exerting substantial pressure when confined against further swelling. These properties make it an ideal material for incorporation in a dry or slightly moist state at points where leakage possibilities occur so that if cracks or other leakage should develop the bentonite will come into contact with the leaking or seeping water and swell to stop the seepage but will not create pressure which might cause further damage.

In accordance with the teaching of the above identified Bechtner patent, it has been proposed to fill the space between a pair of spaced forms or bulkheads with a mass of bentonite to form a water impervious structure. Forms of wood, masonry or any other suitable material are provided and bentonite fills the space between the forms in finely divided form, or in the form of blocks or bricks, or as combined with other material such as sand or gravel.

Heretofore, the use of bentonite has required the construction of expensive and complicated forms, bulkheads, or other compartments in the structure to hold the bentonite. This has added greatly to the expense of using bentonite and, additionally, has created an inconvenience in its use and handling. It would therefore be desirable to provide a preformed moisture impervious panel of bentonite or similar material which may be sawed or otherwise cut into a desired shape and placed in position in a structure.

Accordingly, it is an object of the present invention to provide an improved preformed moisture impervious panel which may be sawed or otherwise cut in any desired shape.

A further object of the present invention is to provide an improved moisture impervious panel which may be readily transported in assembled form.

A further object of the present invention is to provide an improved moisture impervious panel.

Further objects and advantages of the present invention will become apparent as the following description proceeds and the features of novelty which characterize the invention will be pointed out with particularity in the claim annexed to and forming a part of this specification.

In accordance with these and other objects, there is provided an improved preformed moisture impervious panel comprising a corrugated paperboard carrier including a pair of spaced facing sheets interconnected by a corrugated strip which forms a plurality of voids between the strips and respective ones of the facing sheets. The voids are filled with a compacted mass of finely divided colloidal clay, such as bentonite, which is capable of swelling when contacted with water.

For a better understanding of the present invention, reference may be had to the accompanying drawing, wherein:

FIG. 1 is a side view of a moisture impervious panel according to the present invention;

FIG. 2 is an edge view of the moisture impervious panel of FIG. 1; and

FIG. 3 is a perspective view of the moisture impervious panel of FIGS. 1 and 2.

Referring now to the drawing, there is illustrated a preformed moisture impervious panel, generally illustrated at 10, and formed of a corrugated paperboard carrier or form 12 including a pair of spaced paperboard facing sheets 13 and 14, joined and interconnected by a paper corrugated strip 15 to form a plurality of voids between the strips 15 and the facing sheets 13 and 14. The voids are filled with a compacted mass of finely divided swellable bentonite 16. It has been found that substantially dry bentonite is notable for its extreme density and compressive strength when packed into a compact mass.

It will be appreciated that the panel 10 may be preformed and assembled into a moisture impervious structure which may be readily sawed or cut to the desired shape in the field. When subjected to leakage or seepage of moisture, the water pervious paper facing sheets 13 and 14 will pass the moisture to the bentonite filling 16. The bentonite first contacted absorbs water, swells and forms a gel which is permanently resistant to seepage.

The facing sheets 13 and 14 need not be impervious to water; it is sufficient that they give suitable physical strength during shipping and assembly of the panel 10 and that they have no openings which permit the escape of the compacted bentonite therethrough. When the confining bentonite is contacted with water which has seeped through the facing sheets 13 or 14, the bentonite at the surface of the respective facing sheets 13 or 14 immediately absorbs water, swells enormously and forms a gelatinous mass which in itself is impervious to water and provides a moisture impervious panel. Moreover, the water impervious surface of the bentonite will prevent swelling of the remainder of the bentonite so that only the amount of bentonite which can fill the voids will absorb moisture and swell to capacity.

Although the physical strength of the mass of bentonite 16 in the voids may be increased by packing the bentonite in place, to provide a structure capable of transportation without spilling the bentonite 16 from the ends of the void, the edges of the panel 10 may be sealed with wax, tape, or other suitable means.

Although the present invention has been described by reference to only a single embodiment thereof, it will be apparent that numerous other modifications and embodiments may be devised by those skilled in the art and it is intended by the appended claim to cover all modifications and embodiments which fall within the true spirit and scope of the present invention.

What is claimed as new and is desired to be secured by Letters Patent of the United States is:

A moisture impervious panel capable of being cut into a desired shape and comprising a corrugated paperboard form including a pair of spaced paperboard facing sheets interconnected by a corrugated strip which forms a plurality of voids between the strips and respective ones of the facing sheets, and a compacted mass of finely divided water swellable bentonite clay filling said voids.

References Cited by the Examiner

UNITED STATES PATENTS

| | | | |
|---|---|---|---|
| 1,158,667 | 11/15 | Fairchild | 154—45 |
| 1,957,822 | 5/34 | Denning | 154—44 |
| 2,185,799 | 1/40 | Blake et al. | 154—45 |
| 2,277,286 | 3/42 | Bechtner | 61—30 |
| 2,309,206 | 1/43 | Newman. | |

ALEXANDER WYMAN, *Primary Examiner.*

MORRIS SUSSMAN, EARL M. BERGERT, *Examiners.*